United States Patent [19]
Roe

[11] Patent Number: 6,063,288
[45] Date of Patent: May 16, 2000

[54] INHIBITION OF SILICA AND SILICATE DEPOSITION USING IMIDAZOLINES

[75] Inventor: Donald C. Roe, Jamison, Pa.

[73] Assignee: BetzDearborn Inc., Trevose, Pa.

[21] Appl. No.: 09/109,164

[22] Filed: Jun. 30, 1998

[51] Int. Cl.$^7$ .................................. C02F 5/02; C02F 5/04
[52] U.S. Cl. ........................ 210/698; 210/699; 252/175
[58] Field of Search .................................. 210/698, 699; 252/175

[56] References Cited

U.S. PATENT DOCUMENTS

| | | | |
|---|---|---|---|
| 3,674,804 | 7/1972 | Redmore | 260/309.6 |
| 3,766,053 | 10/1973 | Seffens | 208/47 |
| 4,172,032 | 10/1979 | Farley | 210/58 |
| 4,405,461 | 9/1983 | Rogers | 210/698 |
| 4,874,527 | 10/1989 | Gill | 210/700 |
| 4,933,090 | 6/1990 | Gill et al. | 210/700 |
| 5,073,299 | 12/1991 | Cook | 252/389.23 |
| 5,078,879 | 1/1992 | Gil et al. | 210/699 |
| 5,158,685 | 10/1992 | Freese | 210/699 |
| 5,300,231 | 4/1994 | Cha | 210/700 |
| 5,378,368 | 1/1995 | Gill | 210/639 |

OTHER PUBLICATIONS

On–Line Testing of Organic Additives for the Inhibition of the Precipitation of Silica From Hypersaline Geothermal Brine, J.E. Harrar et al., *Lawrence Livermore Laboratory*, Apr. 3, 1979, UCID–18091.

*Primary Examiner*—David A. Simmons
*Assistant Examiner*—Betsey J. Morrison
*Attorney, Agent, or Firm*—Greenblum & Bernstein, P.L.C.

[57] ABSTRACT

A method of controlling the deposition of silica-containing scales and their adhesion to surfaces in contact with an aqueous system is disclosed which comprises adding to the aqueous system an imidazoline or imidazoline derivative.

18 Claims, No Drawings

INHIBITION OF SILICA AND SILICATE DEPOSITION USING IMIDAZOLINES

FIELD OF THE INVENTION

The present invention relates to controlling silica deposits in aqueous systems. More particularly, the present invention relates to inhibiting silica/silicate deposition in cooling and boiler water systems using polyepoxysuccinic acid or salt thereof.

BACKGROUND OF THE INVENTION

The problem of scale formation and its attendant affects have troubled water systems for many years. For instance, scale tends to accumulate on the internal walls of various water systems, such as boiler and cooling water systems, thereby reducing heat transfer properties and fluid flow through heat exchanger tubes.

One particular type of deposit, silica, is especially troublesome in some systems. Where the water used in cooling the systems and water cooled industrial heat exchangers is taken directly from lakes, rivers, ponds, or municipal water sources, various amounts of dissolved and suspended solids, including silica, are present. Problems are compounded in operations where water is concentrated, or cycled up, during the process, e.g., cooling systems. As the water evaporates, the silica concentrations increase increasing both the occurrence and the degree of deposition. Increasing silica concentrations can also result in monomeric silica undergoing polymerization to form gelular and/or colloidal silica which can form tenacious deposits.

In cooling water systems, silica and silicate compounds form deposits on the internal metal surfaces in contact with the water flowing through the system. In this manner, heat transfer efficiency becomes severely impeded, which in turn has a deleterious effect on the overall operating efficiency of the cooling water system. Silica and silicate deposition also causes problems on other conduit and piping surfaces, as well as on equipment such as valves, nozzles and pumps.

Although current industrial cooling systems make use of sophisticated external treatments of the feed water, e.g., coagulation, filtration, softening of water prior to it being fed into the water system, these operations are only moderately effective. In all cases, external treatment does not in itself provide adequate treatment since muds, sludge, silts, and dissolved solids such as silicate can escape the treatment and eventually are introduced into the system.

Silica (silicon dioxide) appears naturally in a number of crystalline and amorphous forms, all of which are sparingly soluble in water; thus leading to the formation of undesirable deposits. Silicates are salts derived from silica or the silicic acids, especially orthosilicates and metosilicates, which may combine to form polysilicates. All of these, except the alkali silicates are sparingly soluble in water. A number of different forms of silica and silicate salt deposits are possible, and formation depends, among other factors, on the temperature and pH of the water.

Various methods have been utilized for resolving the problem of sludge and silt, including silica, deposition. U.S. Pat. No. 5,378,368 discloses the use of polyether polyamino methylene phosphonates to control silica/silicate deposition in industrial water systems. The polyether polyamino methylene phosphonates may be used alone or in combination with a polymer additive.

U.S. Pat. No. 5,078,879 discloses the use of 2-phosphono-butane tricarboxylicate acid-1,2,4 alone or preferably in combination with an anionic polymer such as a carboxylic/sulfonic polymer, to control the formation of silica/silicate deposits in aqueous systems.

U.S. Pat. No. 4,933,090 discloses the use of a select phosphonate and optionally a carboxylic/sulphonic/polyalkylene oxide polymer to control silica/silicate deposition.

U.S. Pat. No. 4,874,527 discloses the use of an imine polymer, a phosphanate and optionally a source of molybdate or borate ions to control the formation of silica/silicate deposits in aqueous systems.

U.S. Pat. No. 5,158,685 discloses the use of a combination of a hydroxyphosphonoacetic acid and an acrylic acid/alyl hydroxy propyl sulphonate ether polymer to control silica/silicate deposition in cooling water systems.

U.S. Pat. No. 5,300,231 discloses the use of polyether polyamino methylene phosphonates in combination with hydroxy-phosphono acetic acid or amino tris methylene phosphonate to control silica/silicate deposition in various industrial water systems.

U.S. Pat. No. 4,405,461 discloses the use of a treatment comprising an amine to which is attached at least a pair of terminal groups selected from furfuryl and saturated or unsaturated hydrocarbon radicals substituted with one or more hydroxy and carboxy, or a hydrohalide thereof to control the deposition of silica-containing scales.

DETAILED DESCRIPTION OF THE INVENTION

In accordance with the present invention, it has been discovered that imidazolines and derivatives thereof are effective treatment agents for reducing the deposition of silica/silicate in aqueous systems. The method of the present invention comprises adding an effective amount of an imidazoline or imidazoline derivative to an aqueous system being treated.

The treatment for aqueous systems of the present invention is an imidazoline or imidazoline derivative such as 1-hydroxyethyl-2-alkyl imidazoline, substituted carboxylated cocoimidazoline organophosphates and imidazolines reacted with acrylic acid. A variety of imidazoline and imidazoline derivatives are available commercially, for example, the Monateric™, Phosphoteric® and Monazoline™ series of surfactants available from Mona Industries Inc.

An effective amount of imidazoline or imidazoline derivative can be added to an aqueous system being treated. As used herein, the term effective amount is that amount necessary to control silica/silicate deposition in the system being treated. Generally, the effective amount will range from about 1 to about 100 ppm, on an active basis based upon the total weight of the aqueous system being treated.

As used herein, the term controlling the silica/silicate deposition is to include inhibition of silica polymerization, threshold precipitation inhibition, stabilization, dispersion, solubilization, and/or particle size reduction of silica, silicates, calcium and magnesium silicates, and silicon ions. The treatments of the present invention are threshold silicate precipitation inhibitors which also stabilize, disperse and solubilize silica and silicates, and generally reduce the particle size of any precipitated material.

Aqueous system as used herein, is meant to include any type of system containing water, including, but not limited to, cooling water systems, boiler water systems, desalination system, gas scrubber water systems, evaporator systems, paper manufacturing systems, mining systems, and the like.

The imidazoline and imidazoline derivatives of the present invention are well known to those skilled in water treatment art, and are commercially available. The treatment materials of the present invention may be added to the aqueous system being treated by any convenient means. A preferred method of addition is to the makeup water streams. Additionally, other conventional water treatment agents such as corrosion inhibitors can be used in combination with treatments of the present invention.

The present invention will now be further described with reference to a number of specific examples which are to be regarded as illustrative, and not as restricting the scope of the present invention.

EXAMPLES

The efficiency of imidazoline chemistry to inhibit silica/silicate deposition in an aqueous system was evaluated in a stirred batch reverse osmosis apparatus. The apparatus was a pressurized water filter where the filter media was a reverse osmosis membrane and the pressure was provided by compressed nitrogen. An overhead stirrer paddle was positioned near the surface of the membrane filter to provide turbulence to minimize concentration effects.

A synthetic feed water containing 100 ppm silica as $SiO_2$ was added to the apparatus with and without treatment. The feed water was concentrated approximately ten times over a 30–40 minute period, such that the water at the end of the experiment contained about 1000 ppm $SiO_2$. At the conclusion of a run, the reverse osmosis membrane was removed and analyzed for silica to quantify the amount of silica deposited on the membrane. Tests with a chemical treatment were compared to control tests (no chemical treatment) to calculate a percent silica inhibition. The results are summarized in Table I.

TABLE I

| Treatment | Chemical Description | % Silica Inhibition |
| --- | --- | --- |
| 10 ppm Monateric 1000 | Capryloamphodipropionate | 29 |
| 10 ppm Monateric CDX-38 | Cocoamphodiacetate | 0 |
| 10 ppm Monateric CEM-38 | Cocoamphodipropionate | 25 |
| 10 ppm Monateric Cy Na-50 | Capryloamphopropionate | 18 |
| 10 ppm Monazoline O | 1-hydroxy-2-oleylimidazoline | 40 |
| 10 ppm Phosphoteric T-C6 | Carboxylated cocoimidazoline organophosphate | 36 |

The data in Table I shows that imidazoline and imidazoline derivative treatments provide significant silica inhibition.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

I claim:

1. A method of inhibiting the deposition of silica and silicate compounds on surfaces in contact with an aqueous system comprising adding to the aqueous system an imidazoline or derivative thereof at a dosage of from about 1 to about 100 ppm to inhibit the deposition of the silica and silicate compounds and wherein said imidazoline or derivative thereof is selected from 1-hydroxyethyl-2-alkylimidazoline, capryloamphodipropinate, cocoamphodipropionate, carboxylated cocoimidazoline organophosphate, or mixtures thereof.

2. The method of claim 1 wherein said imidazoline or derivative thereof is selected from 1-hydroxyethyl-2-alkylimidazoline, capryloamphodipropinate, cocoamphodipropionate, or mixtures thereof.

3. The method of claim 1 wherein said imidazoline or derivative thereof is a 1-hydroxyethyl-2-alkylimidazoline.

4. The method of claim 1 wherein said imidazoline or derivative thereof is a capryloamphodipropinate.

5. The method of claim 1 wherein said imidazoline or derivative thereof is a cocoamphodipropionate.

6. The method of claim 1 wherein said imidazoline or derivative thereof is a carboxylated cocoimidazoline organophosphate.

7. A method of dispersing silica and silicate compounds in an aqueous system comprising adding to the aqueous system an imidazoline or derivative thereof at a dosage of from about 1 to about 100 ppm to disperse the silica and silicate compounds and wherein said imidazoline or derivative thereof is selected from 1-hydroxyethyl-2-alkylimidazoline, capryloamphodipropinate, cocoamphodipropionate, carboxylated cocoimidazoline organophosphate, or mixtures thereof.

8. The method of claim 7 wherein said imidazoline or derivative thereof is selected from 1-hydroxyethyl-2-alkylimidazoline, capryloamphodipropinate, cocoamphodipropionate, or mixtures thereof.

9. The method of claim 7 wherein said imidazoline or derivative thereof is a 1-hydroxyethyl-2-alkylimidazoline.

10. The method of claim 7 wherein said imidazoline or derivative thereof is a capryloamphodipropinate.

11. The method of claim 7 wherein said imidazoline or derivative thereof is a cocoamphodipropionate.

12. The method of claim 7 wherein said imidazoline or derivative thereof is a carboxylated cocoimidazoline organophosphate.

13. A method of solubilizing silica and silicate compounds in an aqueous system comprising adding to the aqueous system an imidazoline or derivative thereof at a dosage of from about 1 to about 100 ppm to solubilize the silica and silicate compounds and wherein said imidazoline or derivative thereof is selected from 1-hydroxyethyl-2-alkylimidazoline, capryloamphodipropinate, cocoamphodipropionate, carboxylated cocoimidazoline organophosphate, or mixtures thereof.

14. The method of claim 13 wherein said imidazoline or derivative thereof is selected from 1-hydroxyethyl-2-alkylimidazoline, capryloamphodipropinate, cocoamphodipropionate, or mixtures thereof.

15. The method of claim 13 wherein said imidazoline or derivative thereof is a 1-hydroxyethyl-2-alkylimidazoline.

16. The method of claim 13 wherein said imidazoline or derivative thereof is a capryloamphodipropinate.

17. The method of claim 13 wherein said imidazoline or derivative thereof is a cocoamphodipropionate.

18. The method of claim 13 wherein said imidazoline or derivative thereof is a carboxylated cocoimidazoline organophosphate.

* * * * *